US008582557B2

(12) United States Patent
Wildfeuer

(10) Patent No.: US 8,582,557 B2
(45) Date of Patent: Nov. 12, 2013

(54) FAX RELAY TUNNELING

(75) Inventor: Herbert Michael Wildfeuer, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1535 days.

(21) Appl. No.: 11/696,611

(22) Filed: Apr. 4, 2007

(65) Prior Publication Data

US 2008/0247386 A1   Oct. 9, 2008

(51) Int. Cl.
*H04L 12/66* (2006.01)
*H04J 3/16* (2006.01)
*H04M 11/00* (2006.01)

(52) U.S. Cl.
USPC ........... 370/352; 370/401; 370/353; 370/354; 370/395.2; 370/466; 379/88.13

(58) Field of Classification Search
USPC .............. 370/352–356, 401, 465–467, 395.2, 370/251–252; 379/88.13, 93.14–93.15, 379/93.07–93.09, 93.32, 100.12; 709/223–224, 227–229
See application file for complete search history.

(56) References Cited

U.S. PATENT DOCUMENTS

| | | | |
|---|---|---|---|
| 6,064,654 A * | 5/2000 | White-Hauser | 370/248 |
| 6,324,409 B1 * | 11/2001 | Shaffer et al. | 455/552.1 |
| 6,463,053 B1 * | 10/2002 | Chen | 370/352 |
| 6,757,285 B1 * | 6/2004 | Lakhani et al. | 370/395.2 |
| 7,181,209 B2 * | 2/2007 | Tamura | 455/432.1 |
| 7,193,739 B2 * | 3/2007 | Mundra et al. | 358/1.15 |
| 7,283,270 B2 * | 10/2007 | Boire-Lavigne et al. | 358/1.15 |
| 7,616,650 B2 * | 11/2009 | Conner et al. | 370/401 |
| 7,808,974 B2 * | 10/2010 | Ying et al. | 370/352 |
| 7,924,454 B2 * | 4/2011 | Boire-Lavigne et al. | 358/1.15 |
| 2003/0219009 A1 * | 11/2003 | Unger | 370/352 |
| 2004/0008668 A1 * | 1/2004 | Droz | 370/352 |
| 2005/0117183 A1 * | 6/2005 | Adlakha et al. | 358/402 |
| 2005/0200891 A1 * | 9/2005 | Cohen | 358/1.15 |
| 2006/0013194 A1 * | 1/2006 | Baumann et al. | 370/352 |
| 2007/0008578 A1 * | 1/2007 | Kajiwara | 358/1.15 |
| 2008/0151873 A1 * | 6/2008 | Borsetti | 370/352 |

FOREIGN PATENT DOCUMENTS

WO    0197481    12/2001

OTHER PUBLICATIONS

U.S. Patent and Trademark Office, "International Preliminary Report on Patentability and Written Opinion"; PCT/US2008/058844; Oct. 15, 2009, 7 pages.
U.S. Patent and Trademark Office, "International Search Report", Aug. 9, 2008, 3 pages.
"Series T: Terminals for Telematic Services Procedures for document facsimile transmission in the general switched telephone network." ITU-T Recommendation T.30 (Sep. 2005). International Telecommunication Union. pp. 1-80. Apr. 4, 2007. http://www.itu.int/rec/T-REC-T.30-200509-I/en.

* cited by examiner

*Primary Examiner* — Asad Nawaz
*Assistant Examiner* — Wutchung Chu
(74) *Attorney, Agent, or Firm* — Brinks Gilson & Lione

(57) ABSTRACT

A system comprising a first network gateway coupled to a circuit-switched network, the first network gateway to initiate a tunnel through the circuit-switched network responsive to packetized fax relay data received from a packet-switched network, and a second network gateway couple to the circuit-switched network, the second network gateway to receive packetized fax relay data through a tunnel over the circuit-switched network from the first network gateway.

20 Claims, 3 Drawing Sheets

FAX RELAY TUNNELING

FIELD OF THE INVENTION

This invention relates generally to network communications.

BACKGROUND

Real time fax relay, for example, implemented with a T.30 protocol, allows a local facsimile machine to send fax pages over one or more networks to a remote facsimile machine, such that the remote facsimile machine receives the fax pages while the local facsimile machine is still transmitting the fax pages. Due to real time nature of these fax transmissions, the T.30 protocol includes timeout functionality that allows the local facsimile machine to retransmit data from a fax page that was incorrectly received by the remote facsimile machine.

When there is excessive transmission delay over the communication network, the remote facsimile machine will trigger timeouts requesting the local facsimile machine retransmit the delayed data. This transmission delay may be caused when at least one of the networks are bandwidth constrained, or by other inherent properties of the networks. For instance, when one of the networks is an IP network, the total transmission delay increases with demodulation, packetization, and remodulation of fax data as well as the addition of de-jitter buffers. Previously, IP gateways spoofed the local facsimile machine into a "hold off" condition, forcing a postponement of the retransmission of fax data until the transmission delay lessened.

Fax pages are often transmitted through multiple tandemly coupled communication networks, such as a TDM network coupled between IP networks, requiring a conversion from packet encoding to an analog signal that adds to the total transmission delay. The transmission delay due to network conversion further increases with each additional tandemly coupled network. Since the transmission delay due to network conversion is systemically-based according to network configuration, many IP gateways will spoof or "hold off" retransmissions indefinitely thus locking up real time fax relay.

DETAILED DESCRIPTION

Overview

In network communications, an example system implementing fax relay tunneling includes a first network gateway coupled to a circuit-switched network, the first network gateway to initiate a tunnel through the circuit-switched network responsive to packetized fax relay data received from a packet-switched network, and a second network gateway couple to the circuit-switched network, the second network gateway to receive packetized fax relay data through a tunnel over the circuit-switched network from the first network gateway.

Description

Figure 1:
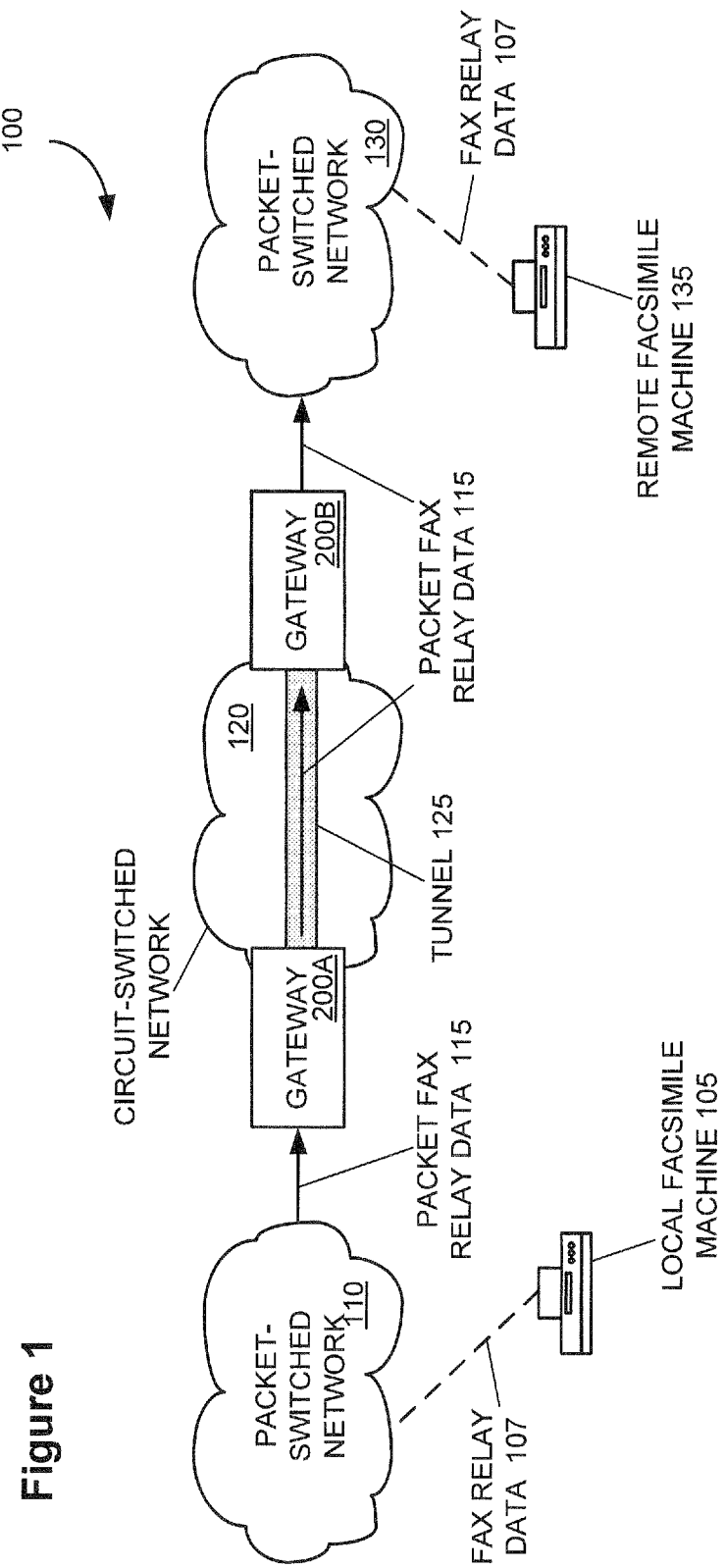
FIG. 1 illustrates an example system implementing fax relay tunneling.

FIG. 1 illustrates an example system 100 implementing fax relay tunneling. Referring to FIG. 1, a real time fax relay system 100 includes a local facsimile machine 105 to send fax relay data 107 to a remote facsimile machine 135 over at least a plurality of networks 110, 120, and 130. For instance, the networks 110, 120, and 130 may be tandem networks where a circuit-switched network 120 is coupled between two packet-switched networks 110 and 130 along the path from the local facsimile machine 105 to remote facsimile machine 135. Although not shown in FIG. 1, many additional networks may be coupled between local facsimile machine 105 and packet-switched network 110, and/or between remote facsimile machine 135 and packet-switched network 130.

The local facsimile machine 105 transmits fax relay data 107 to a gateway 200A over the packet-switched network 110. In some embodiments, the fax relay data 107 may be converted to packet fax relay data 115 by an intermediate gateway or other networking device (not shown) prior to traversing the packet-switched network 110. The packet fax relay data 115 may correspond to at least a portion of fax pages scanned for real time fax relay protocol transmission, e.g., T.30 protocol, to the remote facsimile machine 135. The local facsimile machine 105 may packetized the fax relay data 107 or the packetization may be performed by another device (not shown) located in the packet switched network 110 or between the packet-switched network 110 and the local facsimile machine 105.

The gateway 200A receives packet fax relay data 115 from the packet-switched network 110 and forwards the data over the circuit-switched network 120 for eventual receipt by the remote facsimile machine 135. The gateway 200A identifies another gateway 200B capable of receiving the packet fax relay data 115 in a tunnel 125 through the circuit-switched network 120. In some embodiments, the gateway 200A identifies that gateway 200B is coupled to another packet-switched network 130 and that the gateway 200B may forward the packet fax relay data 115 towards the remote facsimile machine 135 over the packet-switched network 130. When a suitable gateway endpoint for receiving the packet fax relay data 115 in a tunnel 125 through the circuit-switched network 120 cannot be identified, the gateway 200A may convert the packet fax relay data 115 to analog signals, e.g., TDM bearer signals, for transport over the circuit-switched network 120.

The gateway 200A initiates a tunnel 125 through the circuit-switched network 120 for transporting packet fax relay data 115 to gateway 200B. The gateway 200B may send the packet fax relay data 115 received in tunnel 125 to the remote facsimile machine 135 over the packet-switched network 130 according to the real time fax relay protocol. The packet fax relay data 115 received in tunnel 125 may be provided to the remote facsimile machine 135 over one or more additional networks (not shown) and may require additional data conversion and/or tunneling prior to reception at the remote facsimile endpoint 135. In some embodiments, the packet fax relay data 115 may be converted to fax relay data 107 by an intermediate gateway or other networking device (not shown) located in the packet-switched network 130 prior to being forwarded to the remote facsimile endpoint 135 over at least one additional network (not shown).

By tunneling the packet fax relay data 115 through the circuit-switched network 120, instead of converting them to TDM bearer signals, the gateway 200B does not have to reconvert the TDM bearer signals back to packet fax relay data 115 when received from the circuit-switched network 120. Furthermore, since conversions from packet encoding to analog signal encoding require de-jitter buffering of the packet fax relay data 115 to ensure synchronous analog signals are provided over the circuit-switched network 120, tunneling the packet fax relay data 115 through the circuit-switched network 120 may reduce the overall delay in the transmission of fax relay data 107 between local facsimile machine 105 and remote facsimile machine 135.

Figure 2:
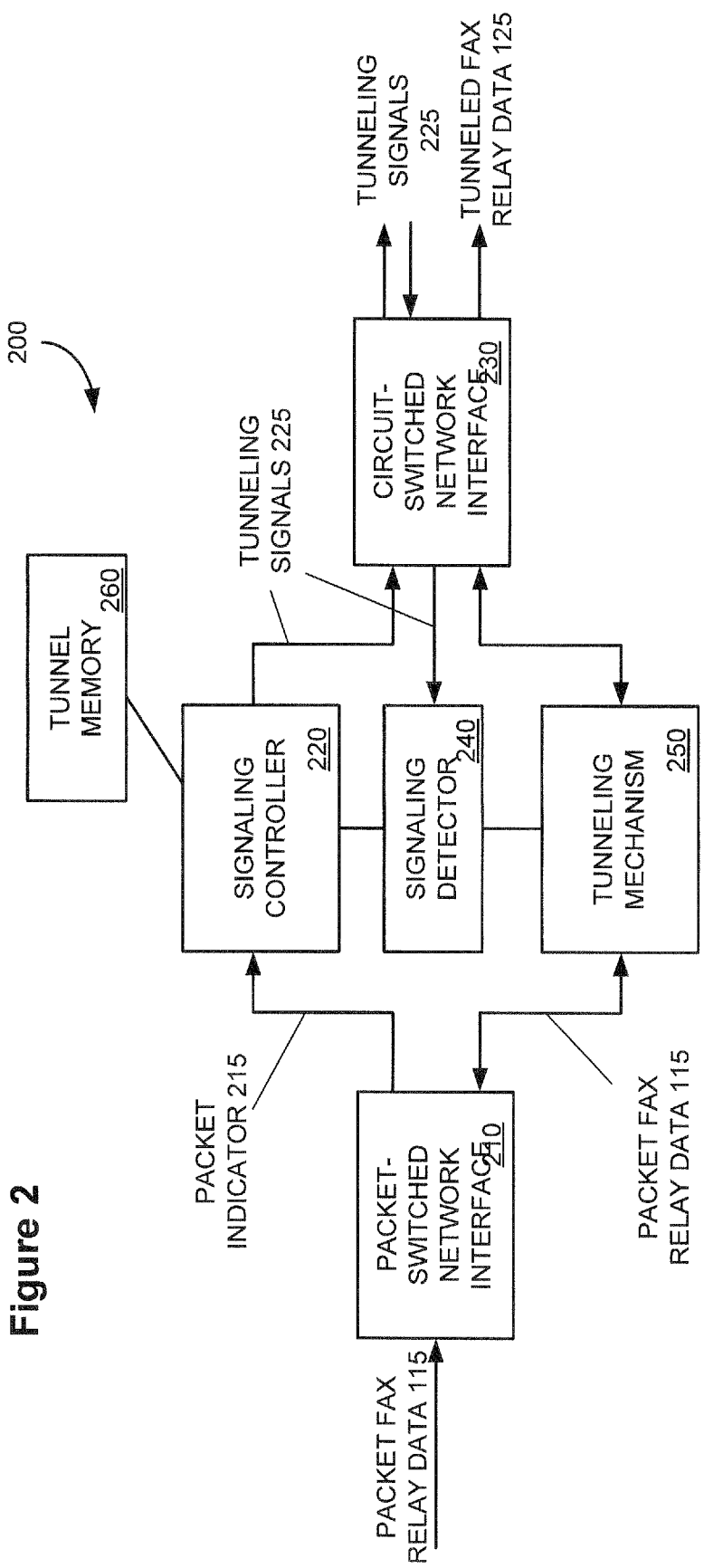
FIG. 2 illustrates example embodiments of a gateway shown in FIG. 1.

FIG. 2 illustrates example embodiments of a gateway 200 shown in FIG. 1. Referring to FIG. 2, the gateway 200 includes a packet-switched network interface 210 for exchanging data over a packet-switched network 110 or 130. The packet-switched network interface 210 may receive packet fax relay data 115 from the packet-switched network 110 for transmission over the circuit-switched network 120 to a recipient endpoint, such as gateway 200B or other networking device. The packet-switched network interface 210 may provide a packet indicator 215 to a signaling controller 220 responsive to the receipt of the packet fax relay data 115. In some embodiments, the packet-switched network interface 210 may include a de-jitter buffer (not shown) for storing and organizing the received packet fax relay data 115.

The signaling controller 220 may generate tunneling signals 225 responsive to the packet indicator 215. The tunneling signals 225 may be sent to gateway 200B over the circuit-switched network 120 via a circuit-switched network interface 230 or through out-of-band signaling. When the tunneling signals 225 are sent in-band over the circuit-switched network 120, the signaling controller 220 embeds the tunneling signals 225 into, e.g., a TDM data stream, without affecting the voice or fax quality of the TDM connection. In some embodiments, the signaling controller 220 may embed the tunneling signals 225 in every voice or data 8 samples.

The tunneling signals 225 may request identification of a recipient endpoint, i.e., gateway 200B, including whether the recipient endpoint is capable of receiving tunneled packet fax relay data 115. The recipient endpoint may respond to the tunneling signals 225 affirming that it is capable of receiving tunneled packet fax relay data 115 from the gateway 200.

In some embodiments, the signaling controller 220 may generate tunneling signals 225 that broadcast the capabilities of the gateway 200. The broadcasting may be performed periodically, intermittently, sporadically, etc. Thus, all gateways 200 receiving the broadcast will understand the capabilities of the transmitting gateway 200.

In some embodiments, the signaling controller 220 may access a tunnel memory 260 to determine if there is a recipient endpoint that has previously received tunnel data from the gateway 200. The tunnel memory 260 may include one or more identifiers associated with recipient endpoints capable of receiving tunneled data. When there is a recipient endpoint identified in the tunnel memory 260, the signaling controller 220 may generate a tunneling signal 225 that alerts the recipient endpoint of a tunnel and data that the gateway is going to provide. In some embodiments, the signaling controller 220 determines to not generate tunneling signals 225 responsive to identifying the recipient endpoint in the tunnel memory 260. The tunnel memory 260 may also identify recipient endpoints that cannot receive tunnel data. The signaling controller 220 may determine to not send tunneling signals 225 responsive to identifying a recipient endpoint that cannot receive tunnel data.

When receiving tunneling signals 225, the circuit-switched network interface 230 forwards them to a signaling detector 240 for analysis. The signaling detector 240 may determine to send the packet fax relay data 115 to the recipient endpoint responsive the tunneling signals 225 and prompt a tunneling mechanism 250 to initiate a tunnel through the circuit-switched network 120 for the transport of the packet fax relay data 115. In some embodiments, the tunneling mechanism 250 may include a de-jitter buffer (not shown) for storing and organizing packet fax relay data 115 received from the packet-switched network interface 210 when prompted by the signaling detector 240, for example, during non-tunneling events.

The signaling detector 240 may also provide information to the signaling controller 220 for use in updating the tunnel memory 260 or for responding to the received tunneling signals 225. In some embodiments, when there is a broadcast by a gateway 200 received at circuit-switched network interface 230, the receiving gateway 200 may update the tunnel memory 260 according to the contents of the broadcast.

Figure 3:
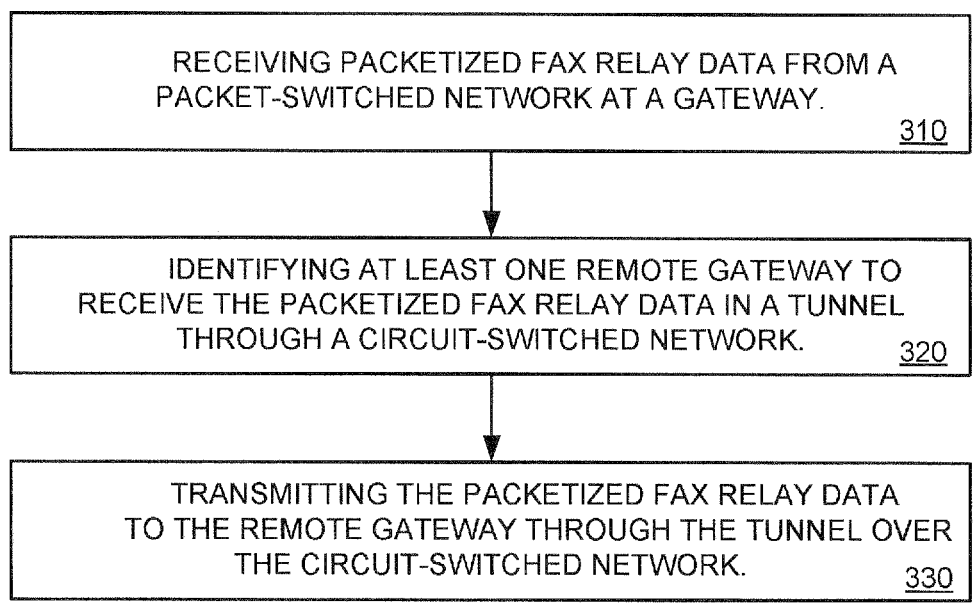
FIG. 3 shows an example method for implementing fax relay tunneling.

The tunneling mechanism 250 may include some signaling (not shown) within transmissions through the circuit-switched network 120 indicating to the recipient endpoint that the data included is packet encoded. This signaling may be similar to the tunneling signals 225 sent by the signaling controller 220. In some embodiments, the signaling controller 220 provides the signaling (not shown) within transmissions through the circuit-switched network 120 indicating to the recipient endpoint that the data included is packet encoded FIG. 3 shows an example method for implementing fax relay tunneling. Referring to FIG. 3, in a block 310, a gateway 200A receives packet fax relay data 115 from a packet-switched network 110. The packet fax relay data 115 may be at least a portion of a fax page in transit between a local facsimile machine 105 and a remote facsimile machine 135.

In a block 320, the gateway 200A identifies at least one remote gateway 200B to receive the packet fax relay data 115 in a tunnel through a circuit-switched network 120. The gateway 200A may identify that gateway 200B can receive tunnel packet fax relay data 115 by sending tunneling signals 225 to the gateway 200B requesting a response including the capabilities of the gateway 220B, or by accessing a tunnel memory 260 to determine whether the gateway 200B has received tunneled data previously or if the gateway 200B sent a previous broadcast of its capabilities.

The gateway 200A may also determine whether gateway 200B should receive packet fax relay data 115 in tunnel 125 through circuit-switched network 120. For instance, when gateway 200B is not coupled to another packet-switched network 130 in a tandem IP network configuration, the gateway 200A may optionally determine to convert the packet fax relay data 115 instead of tunnel the data 115 through circuit-switched network 120.

In a block 330, the gateway 220A transmits the packet fax relay data 115 to gateway 200B in a tunnel 125 through the circuit-switched network 120. The gateway 220A may initiate the tunnel 125 responsive to identifying that gateway 200B can receive tunneled packet fax relay data 115, as described above referencing block 320.

One of skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. Although FIGS. 1-3 describe tunneling through a circuit-switched network with fax relay data, embodiments of present invention may tunnel other types of data and/or with different protocols.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

The invention claimed is:

1. A device comprising:
a packet-switched network interface to receive packetized fax relay data from a packet-switched network, the packetized fax relay data associated with facsimile data from a facsimile machine implementing a real time relay fax protocol;
a circuit-switch network interface to receive signaling from a remote networking device over a circuit-switched network, where the signaling is configured to indicate that the remote networking device is configured to receive packetized fax relay data in a tunnel through the circuit-switched network;
a tunneling mechanism to initiate the tunnel through the circuit-switched network in response to the signaling from the remote networking device, where the circuit-switch network interface is configured to transmit the packetized fax relay data to the remote networking device in the tunnel through the circuit-switched network;
a tunneling memory to store an identifier associated with the remote networking device and a configuration associated with the tunnel and the identifier; and
a signaling unit to re-initiate the tunnel with the remote networking device in response to a subsequent communication with the remote networking device, the re-initiation by the tunneling mechanism by retrieval of the configuration associated with the tunnel from the tunneling memory based on the identifier of the remote networking device.

2. The device of claim 1, where the signaling unit is configured to prompt-the circuit-switch network interface to transmit tunneling signals to the remote networking device over the circuit-switched network, where the tunneling signals include a request for the signaling from the remote networking device, which indicates whether the remote networking device is configured to receive the packetized fax relay data in the tunnel through the circuit-switched network.

3. The device of claim 2 where the signaling includes tunneling capabilities of the remote networking device.

4. The device of claim 2 where the tunneling signals include a media type associated with the tunnel.

5. The device of claim 1, where the signaling unit is configured to prompt the circuit-switched network interface to transmit out-of band tunneling signals to the remote networking device located over the circuit-switched network, where the out-of band tunneling signals include a request for the signaling from the remote networking device.

6. The device of claim 1, where the signaling unit is configured to prompt the circuit-switched network interface to provide tunneling signals to the remote networking device associated with the identifier, where the tunneling signals are configured to alert the remote networking device of an impending tunneling event through the circuit-switched network.

7. The device of claim 1 including a signal detector to analyze the signaling to determine the remote networking device is configured to receive the packetized fax relay data in the tunnel over the circuit-switched network.

8. A method comprising:
receiving, with a network gateway, packetized fax relay data from a packet-switched network, the packetized fax relay data associated with facsimile data from a facsimile machine implementing a real time relay fax protocol;
identifying, with the network gateway, remote networking device to receive the facsimile data;
identifying, with the network gateway, an identifier of the remote networking device and that the remote networking device is configured to receive the packetized fax relay data in a tunnel through a circuit-switched network based on the identifier being stored in a tunnel memory in association with configuration data related to the tunnel;
initiating the tunnel, with the network gateway to transmit the packetized fax relay data through the circuit switched network, the tunnel initiated using the configuration data in the tunnel memory; and
transmitting, with the network gateway, the packetized fax relay data to the remote networking device over the circuit-switched network through the tunnel.

9. The method of claim 8, wherein prior to identifying the identifier of the remote networking device, the method includes sending, with the network gateway, tunneling signals to the remote networking device over the circuit-switched network, where the tunneling signals are configured to request signaling from the remote networking device.

10. The method of claim 9 where the signaling includes tunneling capabilities of the remote networking device.

11. The method of claim 9 where the tunneling signals include a media type associated with the tunnel.

12. The method of claim 8 further comprising sending, with the network gateway, out-of band tunneling signals to the remote networking device located over the circuit-switched network, where the out-of band tunneling signals are configured to request signaling from the remote networking device.

13. The method of claim 8 further comprising:
identifying, with the network gateway, remote networking devices configured to receive the packetized fax relay data in tunnels through the circuit-switched network in response to signaling received from the remote networking devices;
storing, with the network gateway, identifiers of the remote networking devices configured to receive the packetized fax data in the tunnels over the circuit-switched network; and
sending, with the network gateway, an alert to the remote networking device corresponding to at least one of the stored identifiers, where the alert is configured to identify an impending tunneling event through the circuit-switched network to the remote networking device.

14. The method of claim 8 further comprising receiving, with the network gateway, signaling from the remote networking device over the circuit-switched network in a mass broadcast from the remote networking device.

15. The method of claim 8 further comprising:
identifying, with the network gateway, a connection to the remote networking device, the connection generates a tandem IP network configuration; and
sending, with the network gateway, data to the remote networking device in the tunnel through the circuit-switched network in response to both the identification of the tandem IP network configuration and signaling that indicates the remote networking device is configured to receive data in the tunnel.

16. An apparatus comprising:
means for receiving packetized fax relay data from a packet-switched network, the packetized fax relay data associated with facsimile data from a facsimile machine implementing a real time relay fax protocol;
means for determining the remote networking device is configured to receive the packetized fax relay data in a tunnel through the circuit-switched network by retrieval of information associated with the remote networking device from a tunnel memory;

means for creating the tunnel through the circuit-switched network based on the retrieved information from the tunnel memory; and means for transmitting the packetized fax relay data to the remote networking device over the circuit-switched network through the tunnel.

17. The apparatus of claim 16, where the means for determining is further configured to indicate absence of the information associated with the remote networking device is stored in the tunnel memory;

where the means for transmitting is configured to transmit tunneling signals to the remote networking device over the circuit-switched network in response to the indication of absence of information associated with the remote networking device being stored in the tunnel memory, where the tunneling signals are configured to request the signaling from the remote networking device;

where the means for receiving is configured to receive signaling from the remote networking device over the circuit-switched network; and where the means for determining is configured to determine from the signaling that the remote networking device is configured to receive the packetized fax relay data in the tunnel through the circuit-switched network.

18. The apparatus of claim 16, further comprising means for storing identifiers of remote networking devices that are capable of receiving packetized fax data in tunnels over the circuit-switched network, the remote networking devices identified in response to signaling received from the remote networking devices, and where the means for transmitting is configured to transmit an alert to the remote networking device corresponding to at least one of the stored identifiers, where the alert is configured to identify an impending tunneling event through the circuit-switched network to the remote networking device.

19. The apparatus of claim 17, further comprising means for receiving the signaling from the remote networking device over the circuit-switched network in a mass broadcast from the remote networking device.

20. The apparatus of claim 16, further comprising means for identifying a connection to the remote networking device generates a tandem IP network configuration, where the means for transmitting is configured to send data to the remote networking device in the tunnel through the circuit-switched network in response to both the identification of the tandem IP network configuration and signaling that indicates the remote networking device is configured to receive data in the tunnel.

* * * * *